United States Patent
Hobbs et al.

(10) Patent No.: US 9,870,135 B2
(45) Date of Patent: Jan. 16, 2018

(54) TIME SEGMENT USER INTERFACE

(71) Applicant: INTERNATIONAL BUSINESS MACHINES CORPORATION, Armonk, NY (US)

(72) Inventors: Thomas G. Hobbs, Sherfield-on-Loddon (GB); Samuel J. Smith, Southampton (GB); Mark A. Woolley, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 14/605,307

(22) Filed: Jan. 26, 2015

(65) Prior Publication Data

US 2015/0212686 A1 Jul. 30, 2015

(30) Foreign Application Priority Data

Jan. 29, 2014 (GB) .................................. 1401477.3

(51) Int. Cl.
*G06F 3/0484* (2013.01)
*G06Q 10/10* (2012.01)
*G06F 3/0488* (2013.01)

(52) U.S. Cl.
CPC ...... *G06F 3/04847* (2013.01); *G06F 3/04883* (2013.01); *G06Q 10/109* (2013.01)

(58) Field of Classification Search
CPC .......................... G06F 17/30247; G06T 15/00
USPC ....... 715/740, 743, 763–765, 851, 854, 716, 715/863, 848
See application file for complete search history.

(56) References Cited

U.S. PATENT DOCUMENTS

| 4,870,759 | A | 10/1989 | Burton et al. |
|---|---|---|---|
| 7,992,102 | B1 | 8/2011 | De Angelo |
| 8,102,380 | B2 | 1/2012 | Ishigaki et al. |
| 9,009,188 | B1* | 4/2015 | Chechik ............ G06F 17/30247 382/305 |
| 9,142,056 | B1* | 9/2015 | Baran ...................... G06T 15/00 |
| 9,317,937 | B2* | 4/2016 | Le ........................... G06T 11/00 |
| 2006/0092177 | A1 | 5/2006 | Blasko |

(Continued)

FOREIGN PATENT DOCUMENTS

WO 02/35304 A2 5/2002

OTHER PUBLICATIONS

Anonymous, "Touch Screen Gestures", Embedded Interaction Lab, www.embeddedinteractions.com, retrieved Jan. 26, 2015, pp. 1-9.

(Continued)

*Primary Examiner* — Kevin Nguyen
(74) *Attorney, Agent, or Firm* — Law Office of Jim Boice

(57) ABSTRACT

A method operates a device that includes a display device, a user interface device, and a processor connected to the display device and the user interface device. The processor connected to the display device receives a user input defining a line on the display device; detects one or more direction changes in the received user input of the defined line; and defines a line segment according to the detected direction changes, where a length of the line segment is a distance between a start of the defined line and a first detected direction change. One or more processors segment a time period into multiple time segments, where each time segment corresponds in length to the defined line segment. The display device then displays the segmented time period on the defined line segment.

13 Claims, 6 Drawing Sheets

(56) References Cited

U.S. PATENT DOCUMENTS

| | | |
|---|---|---|
| 2007/0236475 A1 | 10/2007 | Wherry |
| 2012/0066629 A1 | 3/2012 | Lee et al. |
| 2012/0092267 A1 | 4/2012 | Haug |
| 2012/0151401 A1 | 6/2012 | Hwang |
| 2012/0262386 A1 | 10/2012 | Kwon et al. |
| 2013/0027412 A1 | 1/2013 | Roddy |
| 2013/0097551 A1 | 4/2013 | Hogan |
| 2013/0283213 A1* | 10/2013 | Guendelman ........... G06F 3/017 715/848 |
| 2016/0162603 A1* | 6/2016 | Schriesheim ........... G06F 17/50 703/1 |

OTHER PUBLICATIONS

A. Stetson, "7 Killer User Interface Designs for Gestures", Fresh Tilled Soil, freshtilledsoil.com, Jul. 17, 2012, pp. 1-9.

* cited by examiner

TIME SEGMENT USER INTERFACE

BACKGROUND

This invention relates to a method of operating a device comprising a display device, a user interface device and a processor, and to the device itself. In a preferred embodiment, the invention addresses problems with specifying and segmenting a period of time using a graphical user interface (GUI).

Many modern computing devices have constraints on the available display area, for example smartphones and tablet computers have restrictions on the size of the display area, since the computing device must be small enough and light enough to be portable. This means that often the user's interaction with the GUI is far more complex and fiddly than is ideal. A typical example of such a user task would be to generate a structured meeting schedule that specifies the meeting duration and the segmentation of time corresponding to a desired agenda. Current solutions involve multiple UI components, such as multiple drop-down menus, making them awkward and time consuming to use. They also produce results that are visually poor and typically also require large amounts of screen real-estate making them unsuitable for modern devices such as smartphones and watches.

SUMMARY

In an embodiment of the present invention, a method operates a device that includes a display device, a user interface device, and a processor connected to the display device and the user interface device. The processor connected to the display device receives a user input defining a line on the display device; detects one or more direction changes in the received user input of the defined line; and defines a line segment according to the detected direction changes, where a length of the line segment is a distance between a start of the defined line and a first detected direction change. One or more processors segment a time period into multiple time segments, where each time segment corresponds in length to the defined line segment. The display device then displays the segmented time period on the defined line segment.

In an embodiment of the present invention, a computer program product operates a device that has a display device, a user interface device, and a processor connected to the display device and the user interface device. The computer program product includes a computer readable storage medium having program code embodied therewith. The computer readable storage medium is not a transitory signal per se, and the program code is readable and executable by a processor to perform a method comprising: receiving a user input defining a line on the display device; detecting one or more direction changes in the received user input of the defined line; defining a line segment according to the detected direction changes, where a length of the line segment is a distance between two successive detected direction changes; segmenting a time period into a plurality of time segments, where each time segment corresponds in length to the defined line segment; and displaying, on the display device, the segmented time period on the defined line segment.

In an embodiment of the present invention, a computer system includes: a display device; a user interface device; a processor; a computer readable memory; a computer readable storage medium; first program instructions to receive a user input defining a line on the display device; second program instructions to detect one or more direction changes in the received user input of the defined line; third program instructions to define a plurality of line segments according to the detected direction changes, wherein a length of at least one of the line segments is a distance from a final detected direction change and an end of the defined line; fourth program instructions to segment a time period into a plurality of time segments, where each time segment corresponds in length to a defined line segment; and fifth program instructions to display, on the display device, the segmented time period on the defined line segment. The first, second, third, fourth, and fifth program instructions are stored on said computer readable storage medium for execution by said processor via said computer readable memory.

BRIEF DESCRIPTION OF THE DRAWINGS

Preferred embodiments of the present invention will now be described, by way of example only, with reference to the following drawings, in which.

DETAILED DESCRIPTION

Figure 1:
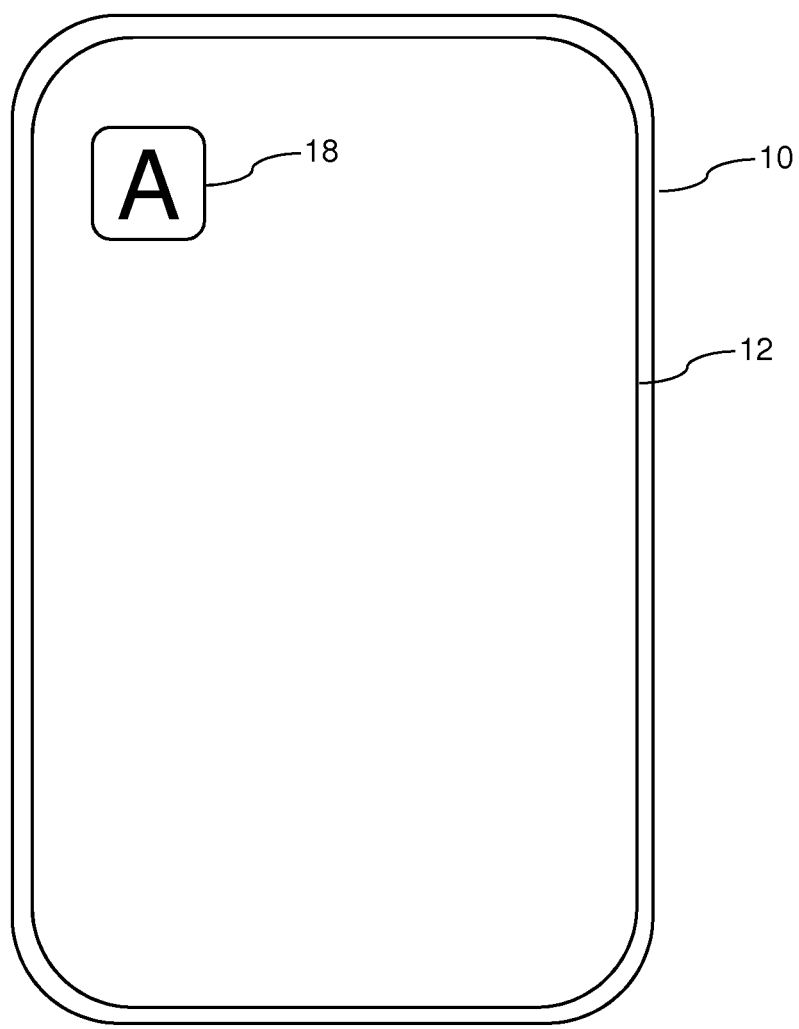
FIG. 1 is a schematic diagram of a touchscreen device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
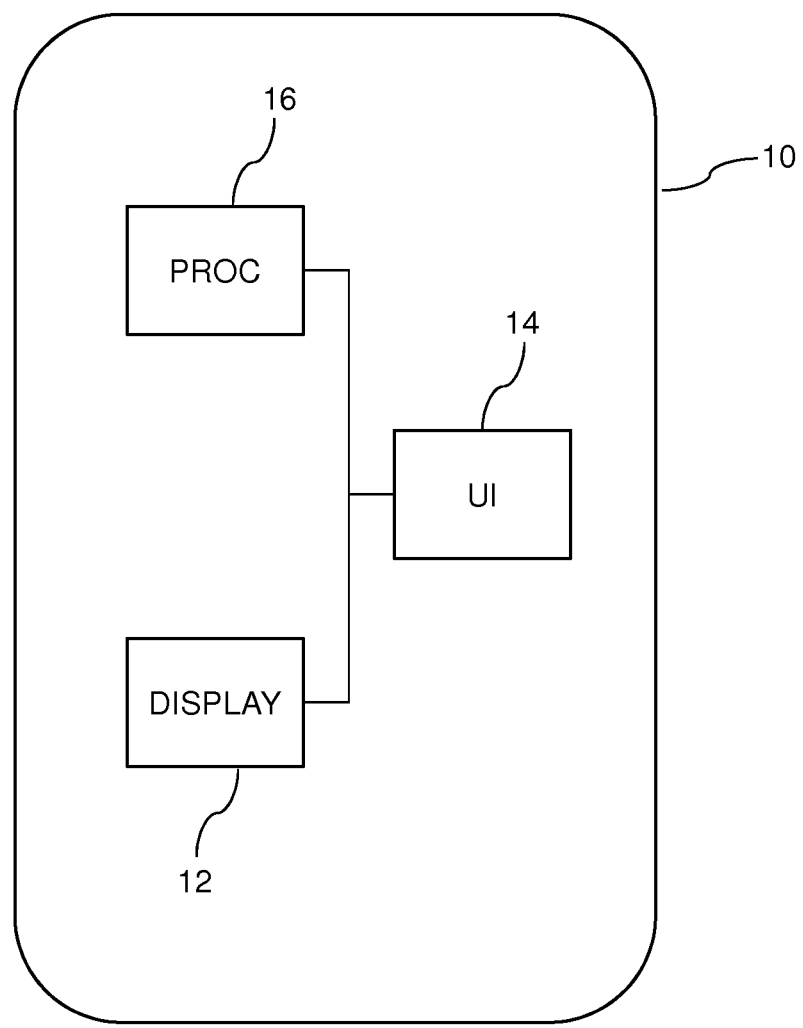
FIG. 2 is a schematic diagram of the internal components of the touchscreen device.

FIG. 1 shows a touchscreen device 10 which is a modern smartphone that has wireless telephony capability but also has advanced display and processing functionality that mean that the device 10 has significant capabilities as a computing device. Such devices 10 are becoming ubiquitous amongst business professionals and are widely used for conventional business applications such as email and calendar functions. The device 10 comprises a display device 12, a user interface device 14 and a processor 16 connected to the display device 12 and the user interface device 14, this is shown schematically in FIG. 2. To the user, the display and input functionalities are combined in the touchscreen 12 although from a technical point of view these are separate components. The processor 16 controls the operation of the device and executes instructions from a computer program product, which can be provided from a computer readable medium such as a suitable storage medium.

High resolution images can be displayed by the touchscreen 12. The user interacts with the touchscreen 12 using their finger and/or a stylus, depending on the touch technology being used to implement the touchscreen 12. For example, the touchscreen 12 may display an icon 18, which the user can touch in order to launch an application that is identified by the respective icon 18. This user interaction is the same as a user would find on a conventional desktop computer where they would use a mouse, for example, to move a cursor onto an icon in order to launch the respective application, for example by double-clicking on a mouse button.

Sophisticated gestures can be recognized by the touchscreen 12. The user can swipe their finger(s) on the screen to achieve various different interactions with the application being currently accessed by the user. The user can make selections by touching the touchscreen 12 in order to "press" virtual buttons being displayed by the touchscreen 12. A virtual keyboard can be displayed on the lower half of the touchscreen 12, which the user can then type on to provide alphanumeric input. Some interactions are natural for the user, but often applications that are representing functions that work well in a conventional desktop computing environment do not work very well on the confines of the smartphone 10.

Figure 3:
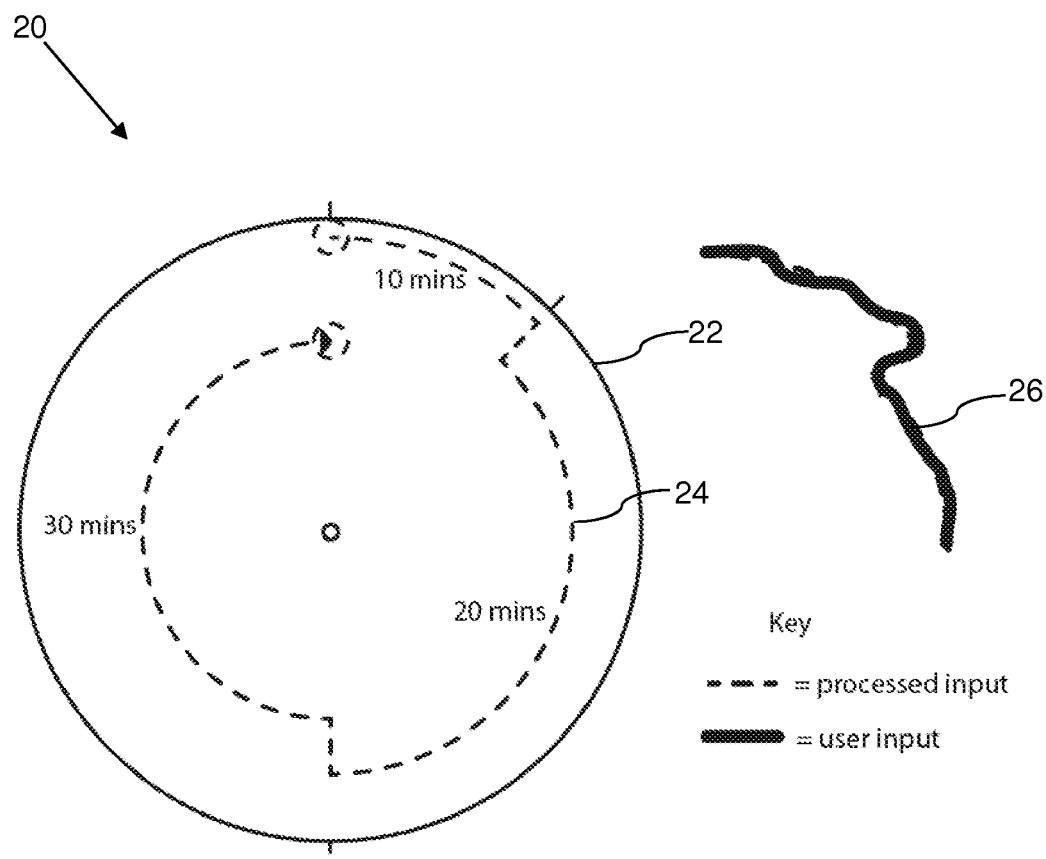
FIG. 3 is a schematic diagram of a graphical user interface.

FIG. 3 shows an example of a graphical user interface 20 for part of a calendar application. The user will access the GUI 20 in order to create a meeting in the calendar. This Figure shows a preferred implementation of the GUI control, which includes a dial 22. The Figure depicts an example input where the user wants to create and segment a one hour event. The user begins by drawing their finger from the 12 o'clock position to the 10 past positions whilst keeping the distance from the center of the dial the same to indicate one segment. The touchscreen 12 identifies the gesture that is being made by the user.

The user then moves their finger towards the center of the dial 22 to indicate a new segment. The next segment is 20 minutes; the end of the segment is indicated by drawing the finger towards the center again to indicate the start of the final segment. The final segment is finished and the end time of the event is indicated by the user releasing their finger from the touchscreen 12. The dotted line 24 is the processed route created by analyzing the user input and "snapping" the distance from the center to a set value. The line 26 shows the actual line drawn by the user, but this is converted to the line 24.

The number of total possible segments would depend on the device 10 and size of dial 22. For example a smaller device such as a watch may have a maximum of five segments to ensure accurate interpretation of the user input route. Alternately a new segment could be indicated by moving the finger away from the center of the circle. A significant change in position is all that is necessary. The dial 22 could represent any period of time (here it is one hour, but this can be changed by the user) and the user could continue their input past a complete rotation. For example a complete rotation could correspond to one hour, or one day or any arbitrary duration.

The device 10 detects the line 26 drawn by the user with their finger on the touchscreen 12 and converts this gesture into the on-screen line 24, interpreting the user's rough input 26 into a smooth line 24. This line 24 can be drawn by the user in a single continuous gesture or could also be generated in several stages, depending upon the proficiency of the user with the touchscreen technology of the device 10. The dial 22 defaults to a set time such as one hour, but this can be changed by the user before they start drawing the line 24, if it does not fit with the meeting length that they are attempting to define.

The user draws the line 24 to indicate the overall length of the meeting in terms of time and also to indicate segments in the meeting using the same line 24, as it is drawn by the user. In the GUI 20 shown in FIG. 3, the user input comprises a curve forming at least part of a circle and each direction change, which comprises a movement relative to the center of the circle, is used to indicate the different segments within the overall time period. In the example of FIG. 3, the user has drawn a line 24 that has three distinct segments, the first being of 10 minutes, the second being of 20 minutes and the third being of 30 minutes, with an overall time period of 60 minutes. The user can indicate a time period of longer than 60 minutes in the same single action by continuing to draw past the start point of the line 24.

As the user draws the line 24, each time they introduce a direction change (in the example of FIG. 3 towards or away from the center of the dial 22), then the processor 16 of the device 10 detects this change of direction and uses the detected direction change as the start and/or end of a time segment within the overall time period defined by the user. The processor 16 will match the direction change to the nearest suitable time period, which might be five minute time periods, rather than generating a very specific but impractical length of time. For example, in FIG. 3, the first change of direction may in fact be at 8 minutes and 23 seconds, but this is changed by the processor 16 to 10 minutes, as the nearest five minute step.

Figure 4:
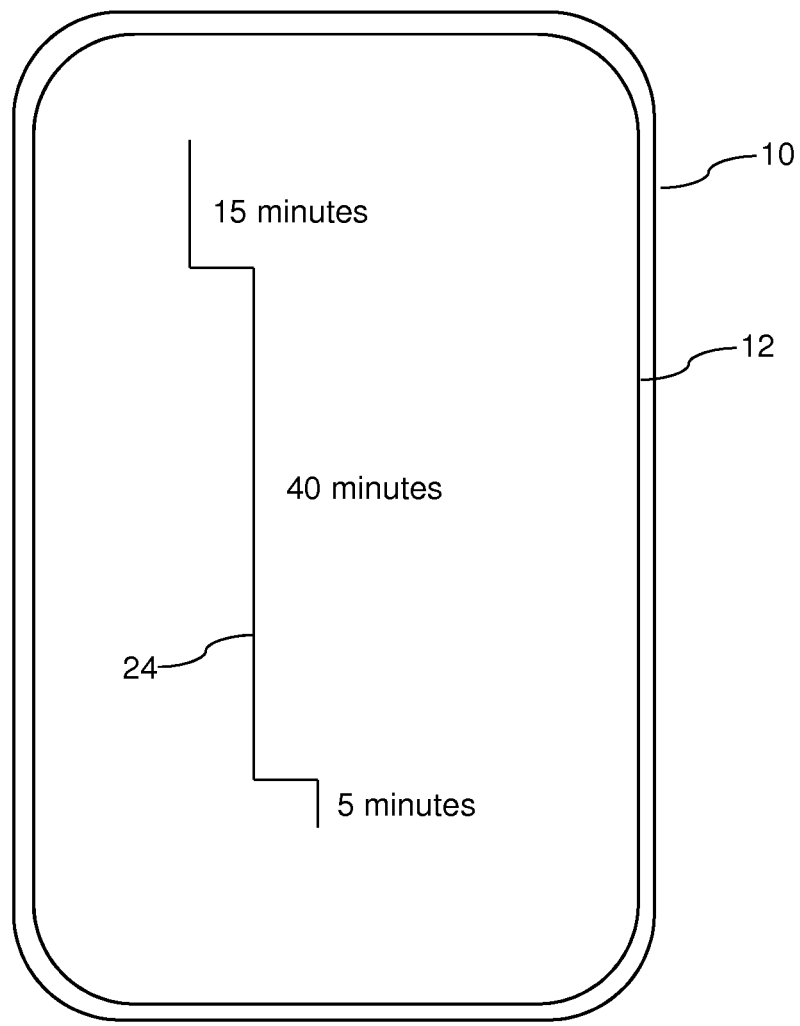
FIG. 4 is a schematic diagram of a second graphical user interface.

FIG. 4 illustrates a second option for the GUI 20. In this embodiment, the user's line 24 is drawn as a straight line, rather than a curve. The detected direction changes identified by the processor 16 when the user draws the line 24 comprise a movement substantially at right angles to the straight line. Here the user is drawing a straight line with their finger and is moving their finger at right angles to indicate the presence of the start and/or end of segments. Some devices 10 have displays that are far more elongate than square and these types of displays will favour the drawing of a straight line rather than the drawing of a curved line.

Once the user has completed the line 24, which can be detected by the user removing their finger from the touchscreen 12 or by the selection of an on-screen finish "button", then the overall time and individual segments will be presented to the user. The user then has the option to label the individual segments within the overall time that has been assigned to the meeting by their original gesture. On a touchscreen device 10 this can be achieved through the conventional on-screen keyboard that can be utilized to enter alpha-numeric data. The GUI 20 will accept the labelling data and attach it to the relevant segments of the meeting.

For example, in FIG. 4, the user has drawn a line 24 that is indicating a meeting length of one hour. The line 24 has been drawn by the user to define three separate segments, the first of which is 15 minutes in length, the second of which is 40 minutes in length and the third of which is 5 minutes in length. This has been indicated by two right-angled direction changes, which define the start and end of the different segments. The first segment can now be labelled by the user as "introduction", the second segment can now be labelled "debate" and the third segment can be labelled "summary". In this way, the user can label the different segments of the meeting.

Figure 5:
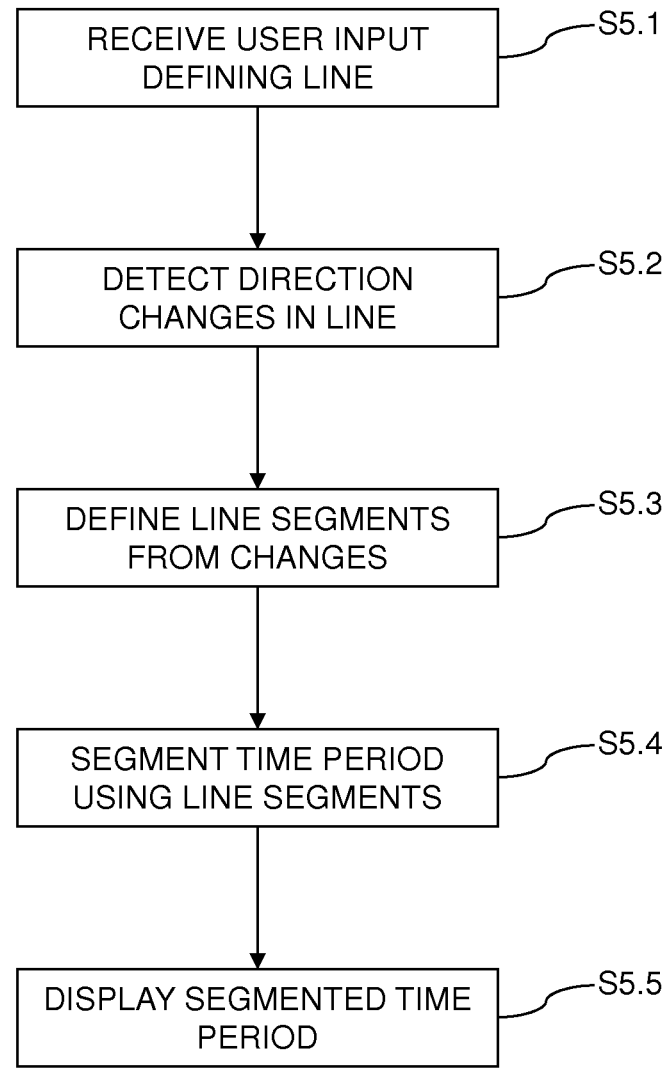
FIG. 5 is a flowchart of a method of operating the touchscreen device.

The method of operating the touchscreen device 10 is summarized in FIG. 5. The method comprises the steps of, firstly step S5.1, which comprises receiving a user input defining a line 24. As discussed above, this line 24 could be a curve or a straight line, for example. The next step in the method comprises step S5.2, which comprises detecting one or more direction changes in the received user input of the defined line 24. As the line 24 is being drawn by the user (in one or more gestures) then direction changes in that line is detected by the processor 16 of the device 10.

The next step of the method is step S5.3, which comprises defining a plurality of line segments according to the detected direction changes, where the length of each line segment is relative to the length of the defined line 24 between either the start of the line 24 and the first direction change, two successive direction changes or the final direction change and the end of the line 24. In this way, the processor 16 assigns specific lengths to the individual parts of the line 24 that have been indicated by the user by the direction changes that were made when the line 24 was created. Each direction change indicates the end of one segment and the start of the next segment.

Step S5.4 comprises segmenting a time period into a plurality of time segments, each time segment corresponding in length to a defined line segment, and step S5.5 comprises displaying the segmented time period. The time period is defined from the overall length of the line 24 drawn by the user. Once the overall line 24 has been segmented into separate lengths by the processor 16, then the overall time period is split up into corresponding segments. This is then displayed to the user, as detailed above. This can allow the user to label the segments, for example. Once the process is complete, then the user can use the segmented (and labelled) meeting schedule by sending it to requested attendees, for example, as is usual within calendar applications.

Figure 6:
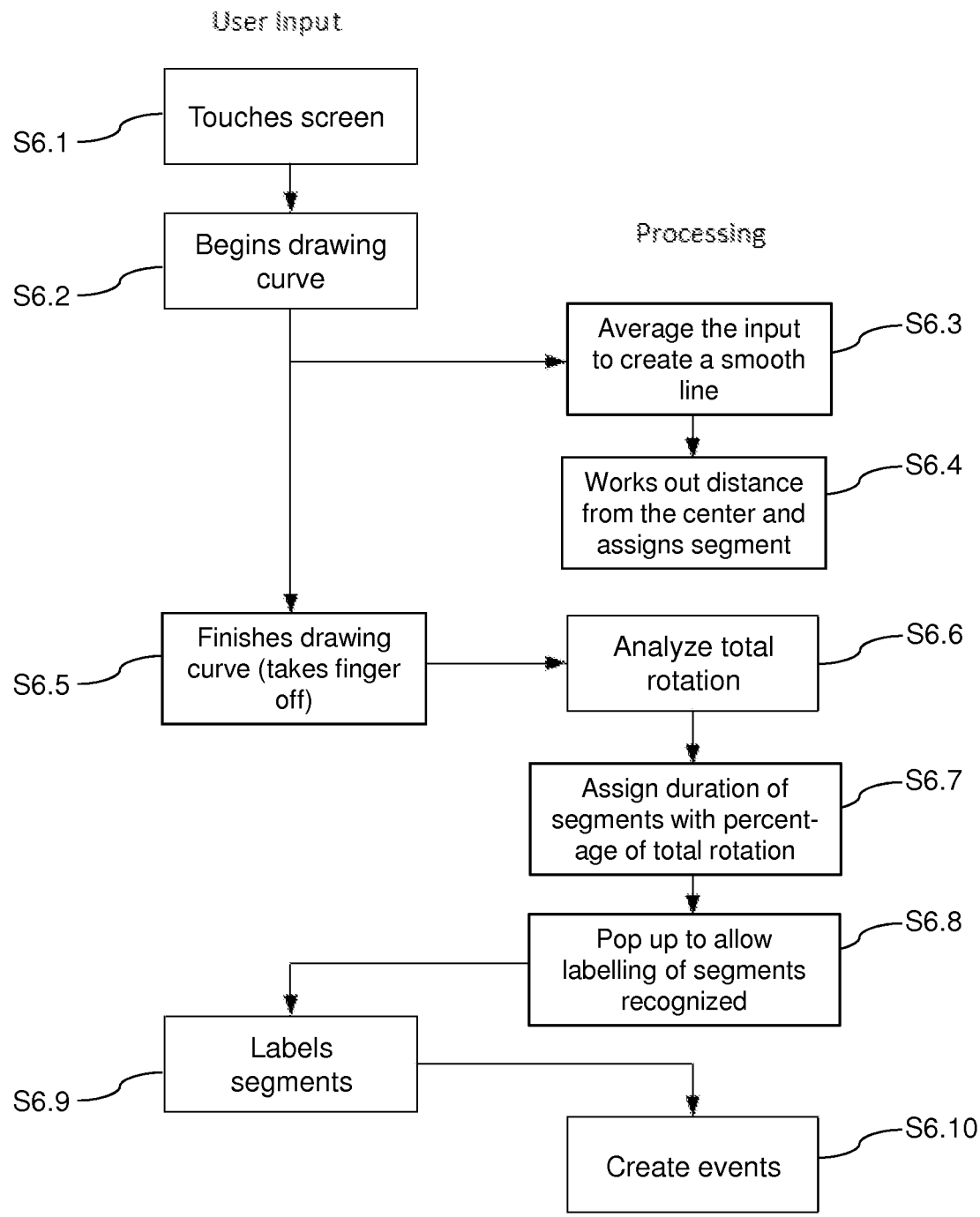
FIG. 6 is a flowchart of a second embodiment of the method of operating the touchscreen device.

FIG. 6 shows a second flowchart of a more detailed specific embodiment of the methodology, using the GUI 20 of FIG. 3 on the touchscreen device 10. At step S6.1, the user touches the touchscreen 12 to initiate the interaction. At step S6.2, the user begins drawing a curve on the dial 22. The processor 16, at step S6.3 averages the input from the user to create a smooth line, as can be seen in FIG. 3. At step S6.4, the processor 16 works out the distance(s) from the center of the dial 22 and assigns segments to the different user-drawn subdivisions of the line 24.

At step S6.5, the user finishes drawing the curve by taking their finger off the touchscreen 12. At step S6.6, the processor 16 analyzes the total rotation that the user defined with their identified gesture. At step S6.7, the processor 16 assigns the duration of the individual segments with a percentage of the total rotation. At step S6.8, the processor 16 provides a pop-up to allow the user to label all of the segments that have been recognized in step S6.4. At step S6.9, the user labels the segments at step S6.10, the processor 16 creates the necessary events within the overall time period and displays this to the user.

In this way, the user can use a single simple gesture to provide multiple different pieces of information to the processor 16. The user interacts with the touchscreen 12 to create a single line 24 that also contains changes of direction within the line 24 that indicate where breaks will occur, thereby defining individual segments within the overall time period. This is much simpler for a user, when compared to using drop-down menus, on a small screen device such as a smartphone. The input method is not limited to use on a touchscreen device, although this is where the main benefit will be found. A conventional desktop computing environment could also support the methodology, with the user moving the mouse to move an on-screen cursor to define the curve or straight line.

According to a first aspect of the present invention, there is provided a method of operating a device comprising a display device, a user interface device and a processor connected to the display device and the user interface device, the method comprising the steps of receiving a user input defining a line, detecting one or more direction changes in the received user input of the defined line, defining a plurality of line segments according to the detected direction changes, the length of each line segment being relative to the length of the defined line between either the start of the defined line and the first detected direction change, two successive detected direction changes or the final detected direction change and the end of the defined line, segmenting a time period into a plurality of time segments, each time segment corresponding in length to a defined line segment, and displaying the segmented time period.

According to a second aspect of the present invention, there is provided a device comprising a display device, a user interface device and a processor connected to the display device and the user interface device, the device arranged to receive a user input defining a line, detect one or more direction changes in the received user input of the defined line, define a plurality of line segments according to the detected direction changes, the length of each line segment being relative to the length of the defined line between either the start of the defined line and the first detected direction change, two successive detected direction changes or the final detected direction change and the end of the defined line, segment a time period into a plurality of time segments, each time segment corresponding in length to a defined line segment, and display the segmented time period.

According to a third aspect of the present invention, there is provided a computer program product on a computer readable medium for operating a device comprising a display device, a user interface device and a processor connected to the display device and the user interface device, the product comprising instructions for receiving a user input defining a line, detecting one or more direction changes in the received user input of the defined line, defining a plurality of line segments according to the detected direction changes, the length of each line segment being relative to the length of the defined line between either the start of the defined line and the first detected direction change, two successive detected direction changes or the final detected direction change and the end of the defined line, segmenting a time period into a plurality of time segments, each time segment corresponding in length to a defined line segment, and displaying the segmented time period.

According to a fourth aspect, there is provided a computer program comprising computer program code stored on a computer-readable medium to, when loaded into a computer system and executed thereon, cause said computer system to perform all the steps of a method according to the first aspect.

Owing to the invention, it is possible to provide an improved GUI methodology that allows a user to input a time period which is segmented in a single simple action. The length of the time period is determined from the length of the line inputted by the user. In a preferred embodiment, the interface component is in the form of a dial/clock-like control. This component allows a user to perform a single circular movement to capture multiple pieces of information. The device will capture both the rotation and the distance from the center and then translate that into data that can be subsequently applied to something such as a meeting agenda. On a touchscreen device such as a mobile phone, a user can draw (part of) a circle with their finger on the touchscreen to indicate the length of a meeting (in terms of time) and can also indicate segments within the meeting by moving their finger towards the center of the circle as they draw a circular line.

The main advantages of the methodology are a single input that captures total time, required segments and the amount of time assigned to each segment. This saves time since fewer user actions are required which saves time and reduces complexity. The methodology saves space since it takes up less display space making it ideal for mobile applications. The allocation of time is easier to visualize when compared to drop-down date/time selections since it allows the user to visualize the segmented time. The methodology is well suited to mobile devices and can be easily implemented on a small mobile device or watch. The data provided by the input method is scalable data since all data recorded is based on a percentage of the total duration which means it can be scaled post creation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating a device comprising a display device, a user interface device, and a processor connected to the display device and the user interface device, the method comprising:
   receiving, by the processor connected to the display device, a user input defining a line on the display device;
   detecting, by the processor connected to the display device, one or more direction changes in the received user input of the defined line;
   defining, by the processor connected to the display device, a line segment according to the detected direction changes, wherein a length of the line segment is a distance between a start of the defined line and a first detected direction change;
   segmenting, by one or more processors and based on the detected direction changes in the received user input, the line into a plurality of time segments based on the detected direction changes in the received user input, wherein the line represents a predefined time period, and wherein each time segment from the plurality of time segments corresponds in position and length to a different sub-period of the predefined time period;
   generating, by one or more processors, a segmented time line from the plurality of time segments created by the detected direction changes in the received user input, wherein the segmented time line defined by the received user input comprises a curve forming at least part of a circle, and wherein each detected direction change comprises a movement relative to a center of the circle; and
   displaying, by one or more processors, the segmented time line on the display device.

2. The method according to claim 1, wherein the segmented time line defined by the received user input further comprises a straight line, and wherein each detected direction change comprises a movement substantially at right angles to the straight line.

3. The method according to claim 1, wherein the segmented time line represents a meeting schedule for a meeting, wherein each sub-period of the predefined time period is for a different topic of the meeting, and wherein the method further comprises:
   displaying, on the display device, labels that describe each different topic of the meeting on a corresponding section of the segmented time line.

4. The method of claim 3, further comprising:
   populating, by one or more processors, a calendar application with a meeting entry using information derived from the segmented time line and the labels for the meeting.

5. The method according to claim 1, further comprising:
   prior to receiving the user input segmenting the line, displaying, on the screen device, an on-screen element on the display device as a guide to the users input, wherein the on-screen element is an overlaid template that is traced by a user to input a particular shape.

6. A computer program product for operating a device comprising a display device, a user interface device, and a processor connected to the display device and the user interface device, the computer program product comprising a computer readable storage medium having program code embodied therewith, wherein the computer readable storage medium is not a transitory signal per se, and wherein the program code is readable and executable by a processor to perform a method comprising:
   receiving a user input defining a line on the display device;
   detecting one or more direction changes in the received user input of the defined line;
   defining a line segment according to the detected direction changes, wherein a length of the line segment is a distance between two successive detected direction changes;
   segmenting, based on the detected direction changes in the received user input, the line into a plurality of time segments based on the detected direction changes in the received user input, wherein the line represents a predefined time period, and wherein each time segment from the plurality of time segments corresponds in position and length to a different sub-period of the predefined time period;
   generating a segmented time line from the plurality of time segments created by the detected direction changes in the received user input, wherein the segmented time line defined by the received user input comprises a curve forming at least part of a circle, and wherein each detected direction change comprises a movement relative to a center of the circle; and
   displaying, on the display device, the segmented time period on the defined line segment.

7. The computer program product of claim 6, wherein the line defined by the received user input further comprises a straight line, and wherein each detected direction change comprises a movement substantially at right angles to the straight line.

8. The computer program product of claim 6, wherein the method further comprises:
   displaying a line derived from the received user input of the defined line.

9. The computer program product of claim 6, wherein the method further comprises:
   prior to receiving the user input defining the line, displaying an on-screen element on the display device as a guide to the users input, wherein the on-screen element is an overlaid template that is traced by a user to input a particular shape.

10. A computer system comprising:
    a display device;
    a user interface device;
    a processor;
    a computer readable memory;
    a computer readable storage medium;
    first program instructions to receive a user input defining a line on the display device;
    second program instructions to detect one or more direction changes in the received user input of the defined line;

third program instructions to define a plurality of line segments according to the detected direction changes, wherein a length of at least one of the line segments is a distance from a final detected direction change and an end of the defined line;

fourth program instructions to segment, based on detected direction changes in the received user input, the line into a plurality of time segments based on the detected direction changes in the received user input, wherein the line represents a predefined time period, and wherein each time segment from the plurality of time segments corresponds in position and length to a different sub-period of the predefined time period;

fifth program instructions to generate a segmented time line from the plurality of time segments created by the detected direction changes in the received user input, wherein the segmented time line defined by the received user input comprises a curve forming at least part of a circle, and wherein each detected direction change comprises a movement relative to a center of the circle;

sixth program instructions to display, on the display device, the segmented time period on the defined line segment;

and wherein said first, second, third, fourth, fifth and sixth program instructions are stored on said computer readable storage medium for execution by said processor via said computer readable memory.

11. The computer system of claim 10, wherein the line defined by the received user input further comprises a straight line, and wherein each detected direction change comprises a movement substantially at right angles to the straight line.

12. The computer system of claim 10, further comprising:
seventh program instructions to display a line derived from the received user input of the defined line, wherein said seventh program instructions are stored on said computer readable storage medium for execution by said processor via said computer readable memory.

13. The computer system of claim 10, further comprising:
seventh program instructions to, prior to receiving the user input defining the line, display an on-screen element on the display device as a guide to the users input, wherein the on-screen element is an overlaid template that is traced by a user to input a particular shape, and wherein said seventh program instructions are stored on said computer readable storage medium for execution by said processor via said computer readable memory.

\* \* \* \* \*